UNITED STATES PATENT OFFICE.

ETHEL PICKETT, OF LAWHON, LOUISIANA.

PROCESS FOR BLEACHING AND PREPARING STRAW FROM THE SOUTHERN PALM.

No. 926,765.  Specification of Letters Patent.  Patented July 6, 1909.

Application filed February 16, 1909. Serial No. 478,338.

*To all whom it may concern:*

Be it known that I, ETHEL PICKETT, a citizen of the United States, residing at Lawhon, in the parish of Bienville and State of Louisiana, have invented certain new and useful Improvements in Processes for Bleaching and Preparing Straw from the Southern Palm, of which the following is a specification.

This straw is prepared from the palmetto or Southern palm.

Collect the tender palm and carefully strip each leaf apart; wash off any dirt that sticks to it; put it into a vessel containing enough water to cover the leaves; sprinkle salt in the water until it tastes of salt; then boil or scald the leaves until they turn their color. Spread them out in the sun and dew until bleached, being careful to keep them out of the rain. Bleached in this way they never turn yellow as straw does bleached with sulfur and acids. After being bleached, carefully wash each piece with a cloth or sponge and pure water, using no soap. Then the leaves are ready to be worked. The scalding toughens them, and the salt makes them soft and pliable. To strip or shred them for trimmings, or braid for hats and belts, use a fine needle or pin—the finer the needle or pin, the finer the straw. For making rugs, suit cases, traveling bags, baskets, etc., use a row of sharp spikes driven into a solid bench or table or bar secured to same. Hackles or combs of various fineness or coarseness may be prepared and used for hackling said leaves, thus cutting them into straws of various finenesses.

I also use this straw for making table mats, traveling bags, baskets, suit cases, and for such it is unsurpassed for lightness and durability. For millinery it has no equal.

I claim—

1. The process herein described of bleaching and preparing straw from the Southern palm for trimmings for hats, for braids, belts, rugs, suit cases, traveling bags, baskets, etc., which consists in first collecting the tender palm, stripping each leaf apart, washing clean, putting same into salt water enough to cover the leaves, boiling or scalding them until they turn color, then spreading them out in the sun and dew until bleached, then washing each piece with a cloth or sponge and water, using no soap, then shredding into shreds, substantially as and for the purposes set forth.

2. The process herein described of bleaching the Southern palm, which consists in taking the palm while yet tender, stripping each leaf apart, washing off all dirt, putting them into a bath of salt water, scalding them until they turn their color, spreading out in the sun and dew until bleached, then washing each piece with a sponge and pure water, using no soap, substantially as set forth.

In testimony whereof I affix my signature, in presence of two witnesses.

ETHEL PICKETT.

Witnesses:
A. D. TURNER,
D. W. STEWART.